United States Patent

Jagt et al.

[11] Patent Number: 5,898,543
[45] Date of Patent: Apr. 27, 1999

[54] BI-DIRECTIONAL PRE-BENDS IN THE SPRING REGION OF A LOAD BEAM OF A MAGNETIC HEAD SUSPENSION ASSEMBLY

[75] Inventors: David J. Jagt, Hutchinson; Merle L. Painter, Winsted, both of Minn.

[73] Assignee: Hutchinson Technology, Inc., Hutchinson, Minn.

[21] Appl. No.: 08/623,504

[22] Filed: Mar. 28, 1996

[51] Int. Cl.⁶ .................. G11B 5/48; G11B 21/16
[52] U.S. Cl. ........................................... 360/104
[58] Field of Search ........................ 360/104, 106; 72/31, 702

[56] References Cited

U.S. PATENT DOCUMENTS

| | | | |
|---|---|---|---|
| 5,027,242 | 6/1991 | Nishida et al. | 360/107 |
| 5,065,268 | 11/1991 | Hagen | 360/104 |
| 5,471,734 | 12/1995 | Hatch et al. | 360/104 |
| 5,541,789 | 7/1996 | Fukuoka et al. | 360/104 |

*Primary Examiner*—George J. Letscher
*Attorney, Agent, or Firm*—Faegre & Benson, LLP

[57] ABSTRACT

The present invention provides a manner of controlling the part profile of a suspension assembly in order to obtain minimum torsional gains at resonance frequencies. Specifically, the present invention includes a suspension assembly having a load beam provided with a first preformed bend, as used for providing the load force, and a second preformed bend also provided within the spring region of the load beam of the suspension assembly but in a direction opposite to the first preformed bend.

14 Claims, 9 Drawing Sheets

BI-DIRECTIONAL PRE-BENDS IN THE SPRING REGION OF A LOAD BEAM OF A MAGNETIC HEAD SUSPENSION ASSEMBLY

FIELD OF THE INVENTION

The present invention relates to a suspension assembly of the type useable for supporting a head, such as a magnetic head, relative to a data storage medium, such as a disk. The present invention is particularly related to an improved suspension assembly for a magnetic head within a rigid disk drive having improved resonance characteristics.

BACKGROUND OF THE INVENTION

Storage devices typically include a head for reading and/or writing data on to a storage medium. A suspension assembly is required to position and maintain the head at the appropriate position relative to the storage medium for data storage and/or access. Most common today are magnetic heads and magnetic storage media, particularly flexible and rigid disks.

The present invention is directed to a suspension assembly of the type that is typically used for supporting a head relative to a rotating disk wherein the head flies over the disk surface when accessing the disk on an air bearing. Such is the case in most rigid disk drives. Specifically, the magnetic head is usually provided on a slider having an aerodynamic design so that the movement of air caused by a spinning disk will generate a lift force against the slider which prevents contact or crashing of the head with the disk surface. Preferably, the air bearing is minimized while sufficient to accommodate disk fluctuations since storage density is decreased significantly as the height of the air bearing increases.

In order to counteract the lift force acting against the slider, the suspension assembly typically includes a load beam having a resilient section and a rigid section; the resilient section providing a spring force to the rigid section for urging the slider in a direction opposite to the lift force. The "flight" of the slider and head is a balance of the lifting force and the opposing spring force.

A spring or gimballing connection is also typically provided between the slider and the rigid section of the load beam so that the slider can move in the pitch and roll directions of the head for accommodating fluctuations of the disk surface. Such a spring connection can be provided by a gimbal that is made separately and connected with the rigid region of the load beam or is made integrally at the end of the load beam. The spring connection of the gimbal is also preferably designed with high lateral and in-plane stiffnesses. Such gimbals, in general, are well-known.

In addition to providing the aforementioned spring force, the load beam must also provide the rigid link between an actuator of the disk drive and the slider/head assembly for precisely positioning the head relative to data tracks of the storage medium, i.e. the disk surface. Actuator movement is normally either rotary or linear over the disk surface. The ability to provide such a rigid link is adversely affected by the confined geometry constraints of today's disk drives, i.e. disk sizes, disk spacing, data storage densities and access speeds, attachment methods, and low stiffness of the suspension in the Z-height (direction perpendicular to the plane of the disk surface). As the rigid linkability of a load beam is compromised by these other design features, the load beam must otherwise be designed to increase rigidity to prevent off-track errors.

Given these design criteria combined with disk and access speeds, the suspension assembly can be subject to high vibration frequencies which can cause off-track error, particularly at resonance frequencies of the suspension assembly, if not controlled. It is thus an important additional design criteria of suspension assemblies to design the suspension assembly so that its resonance frequencies are higher than the frequencies experienced in the drive environment or to minimize the gain (movement of the suspension assembly at the slider) caused at the resonance frequencies. Of most concern in the design of suspension assemblies are the resonance frequencies of the torsional and lateral bending modes. These torsional and bending modes are beam modes that are dependent on cross-sectional properties along the length of the load beam. These modes also result in lateral movement of the slider at the end of the suspension assembly. Torsional modes sometimes produce a mode shape in which the tip of the resonating suspension assembly moves in a circular fashion. However, since the slider is maintained in a Z-height orientation by the stiffness of the applied spring force acting against the air bearing, only lateral motion of the rotation is seen at the slider. The lateral bending mode is mainly lateral motion.

The lateral bending mode is normally controlled by the design of the cross-section of the load beam, i.e., side rails, channels, and the like. Typically, the resonance frequency of the lateral bending mode is controlled by the load beam design to be higher than the frequencies that are experienced in the disk drives within which they are used. Certain torsional resonance modes, however, occur at lower frequencies, but typically have less of a lateral effect. Torsional modes are further subdivided depending on the number, if any, of nodes present along the length of the suspension assembly between a fixed end thereof and a free end, the slider being supported near the free end. These various torsional mode shapes occur at different resonance frequencies. A single twist of the suspension assembly between the fixed end and the free end, as used throughout this specification, is referred to as first torsion mode, and the off-track motion at the first torsion resonance frequency is referred to as the first torsional gain. Second torsion mode, as used throughout the specification, means a torsional mode shape having a single node along the length of the suspension assembly between its fixed end and its free end. The position of the node divides the suspension assembly into first and second twisting motions on either side of the node point. The second torsional resonance frequencies occur at higher frequencies than the first torsional mode. Second torsional gain refers to the amount of off track motion when the suspension assembly is vibrated at the second torsional resonance frequency. Typically, design consideration must be given to the first and second torsional modes under the vibration frequencies normally experienced within a disk drive environment. Higher order torsional modes, i.e. third torsional mode having two node points, etc., typically occur at frequencies higher than that experienced within the disk drive environment.

Since torsional modes have a twisting movement from the fixed end of a suspension assembly toward its free end, each torsional mode shape (first torsional, second torsional, etc.) defines an axis of rotation along the suspension assembly. The axis of rotation need not, and in fact generally does not, lay within the suspension assembly.

Moreover, it is preferable that the axis of rotation be defined such that it runs through or near a gimballing location of the slider and the load beam of a suspension assembly. If the axis of rotation can be controlled to pass through or near the gimballing point, minimal off-track movement is experienced at the slider. In other words, even if the resonance frequency of a particular torsional mode is experienced in the disk drive environment, the gain associated with that resonance frequency can be controlled to be minimized. It is thus a significant endeavor in the design of suspension assemblies to minimize the gain associated with first and second torsional modes as they typically may be experienced in a disk drive environment.

The mass of the suspension assembly and how that mass is distributed along the suspension assembly has a large impact on the suspension resonance frequency and gain characteristics. For example, the addition of mass at a location of maximum displacement depending on the mode (bending or torsional) can be used to reduce the natural frequency. Although the natural frequency may be lowered, gain may disadvantageously be increased.

In providing the aforementioned spring force to the rigid section of the load beam for counteracting the aerodynamic lift force against the slider, a preformed bend is made in the resilient section of the load beam. This preformed bend is designed with a specific radius to provide the spring force and thus a desired gram loading to the slider when in flight over a disk surface. The term loaded, as used hereinafter, means the suspension assembly in equilibrium under the influence of the aerodynamic lift force and the oppositely acting spring force with the slider at "fly" height.

A manner of optimizing a suspension assembly so that the axis of rotation passes through or near the gimballing point when the suspension assembly is loaded is to modify the suspension assembly to change its loaded profile as represented at its longitudinal centerline, hereinafter "part profile." One way of modifying the part profile is by changing the location of the preformed bend radius area within the spring region of the load beam. By incrementally bending a series of similar suspension assemblies at various locations along the spring area and subjecting each of the suspension assemblies to its torsional resonance frequencies, the gain associated with each bend location can be measured. The measured gain can be plotted against the incremental position of the bend taken from a reference location to determine a curve. At the point where the curve approaches or reaches zero gain, if possible, the axis of rotation is at or nearest to the location of gimballing. In other words, the part profile of the suspension assembly is modified by the position of the radius area of the preformed bend preferably to the point where the axis of rotation passes near or through the gimballing location.

However, on some suspension designs, the minimum point on the curve is not obtainable with the preformed bend because of either process abilities or other design constraints or features (i.e., spring force) which affect the suspension's mass distribution. Additionally, even if the above optimization process can be utilized to minimize first torsional gain, a similar optimization curve representing second torsional gain may not coincide. That is, the location of the radius area of the preformed bend which minimizes first torsional gain may be different from the location which minimizes second torsional gain.

Another manner of controlling the part profile of a suspension assembly is to increase its in-plane stiffness and rigidity by forming its spring region at a precise curvature so that when loaded, the curve becomes shaped to maximize the in-plane stiffness. One prior art method of designing the spring region of a load beam for that purpose is described in U.S. Pat. No. 5,065,268 to Hagen. In this case, two preformed bends are made in the spring region of the load beam in the same bend direction. The preformed bends are precisely located and formed as determined by complex calculations so that the spring region nearly assumes an ideal curve, as defined therein. The object being so that when loaded, the spring region becomes nearly flat, which is utilized to increase the in-plane stiffness.

Another prior art example of designing a specifically curved spring region is described in U.S. Pat. No. 5,471,734 to Hatch et al. According to this method, a single curve side profile is determined theoretically to provide a desired bump and offset characteristics (loaded shape of spring region) and to give the desired load. The spring region must be precisely curved over its length by forming over a forming die having a forming surface calculated to provide the theoretical side curve profile after formation and springback.

In both of the above cases, special calculations and dies and/or forming steps must be determined for each variation of suspension assembly made in order to make a precise curve or approximation thereof for each application.

SUMMARY OF THE INVENTION

The present invention is directed to a suspension assembly and process of making a suspension assembly wherein torsional gains at their resonance frequencies can be minimized in situations that are unattainable with a single preformed bend.

The present invention provides another manner of shifting the part profile of a suspension assembly in order to obtain minimum torsional gains at resonance frequencies. Specifically, the present invention includes a suspension assembly having a load beam provided with a first preformed bend, as known for providing the load, and a second preformed bend also provided within the spring region of the load beam of the suspension assembly but in a direction opposite to the first preformed bend.

The aforementioned advantages can be achieved by a load beam to be incorporated into a suspension assembly that comprises an actuator mounting region for connection to the actuator of the disk drive device; a rigid section for connection to a head slider assembly; and a spring region between the actuator mounting region and the rigid region, the spring region having, in a free state, a first preformed bend and a second preformed bend in a opposite direction than the first preformed bend. Both bends are preferably formed transverse to the longitudinal dimension of the load beam. In other words, surfaces of the load beam on one side of the load beam that are joined together by the first bend are angled with respect to one another by a first included angle of less than 180°, and surfaces of the load beam on a second side of the load beam that are joined together by the second bend are angled with respect to one another by a second included angle of less than 180°.

The first preformed bend preferably provides primarily the load necessary for defining the fly height of a slider in its loaded state. The second preformed bend is provided to shift the part profile of the load beam and thus the suspension assembly for minimizing gain of torsional resonance frequencies. More preferably, the second preformed bend is provided near the rigid section of the load beam and comprises only a slight bend formed about a tight radius in the direction opposite to the total load direction. Generally, the second preformed bend needs only to be slight, since even a minor bend in the opposite direction of the spring force providing first preformed bend will significantly affect the part profile of the suspension assembly. The degree of bend of the second preformed bend is largely dependent on each particular application and is determined empirically by optimization techniques.

The present invention is also directed to the process of making a load beam having an actuator mounting region, a rigid section, and a spring region between the actuator mounting region and the rigid section, the process including forming a first preformed bend in the spring region and forming a second preformed bend in the spring region in an opposite direction than the first preformed bend. The first and second preformed bends are preferably formed transversely to the longitudinal direction of the load beam. Preferably, the second preformed bend is formed closer to the rigid section of the load beam than the first preformed bend. More preferably, the second preformed bend is formed before the first preformed bend to permit accurate loading.

BRIEF DESCRIPTION OF THE DRAWINGS

A detailed description of the preferred embodiments and process of making in accordance with the present invention are described below with reference made to the accompanying drawings in which.

DETAILED DESCRIPTION OF THE PREFERRED EMBODIMENTS

Figure 1:
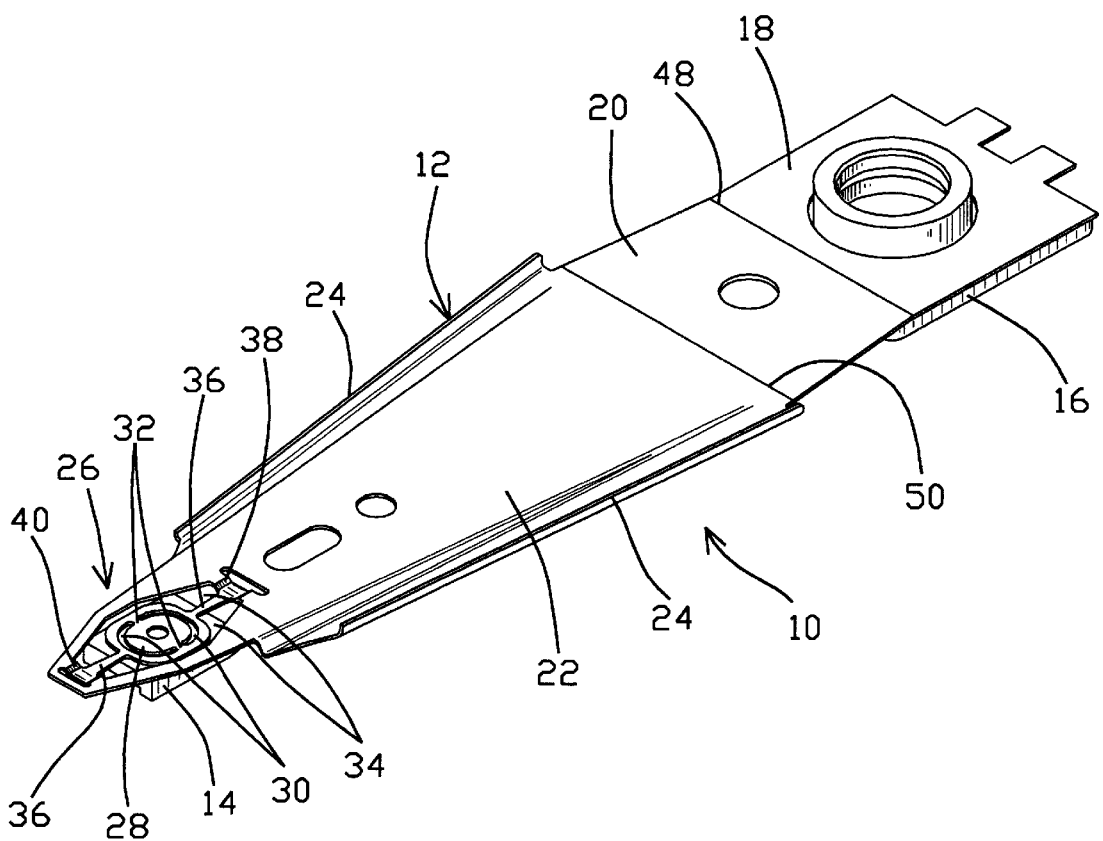
FIG. 1 is an isometric view of a suspension assembly in accordance with the present invention having two preformed bends in opposite directions within the spring region thereof.
Figure 2:
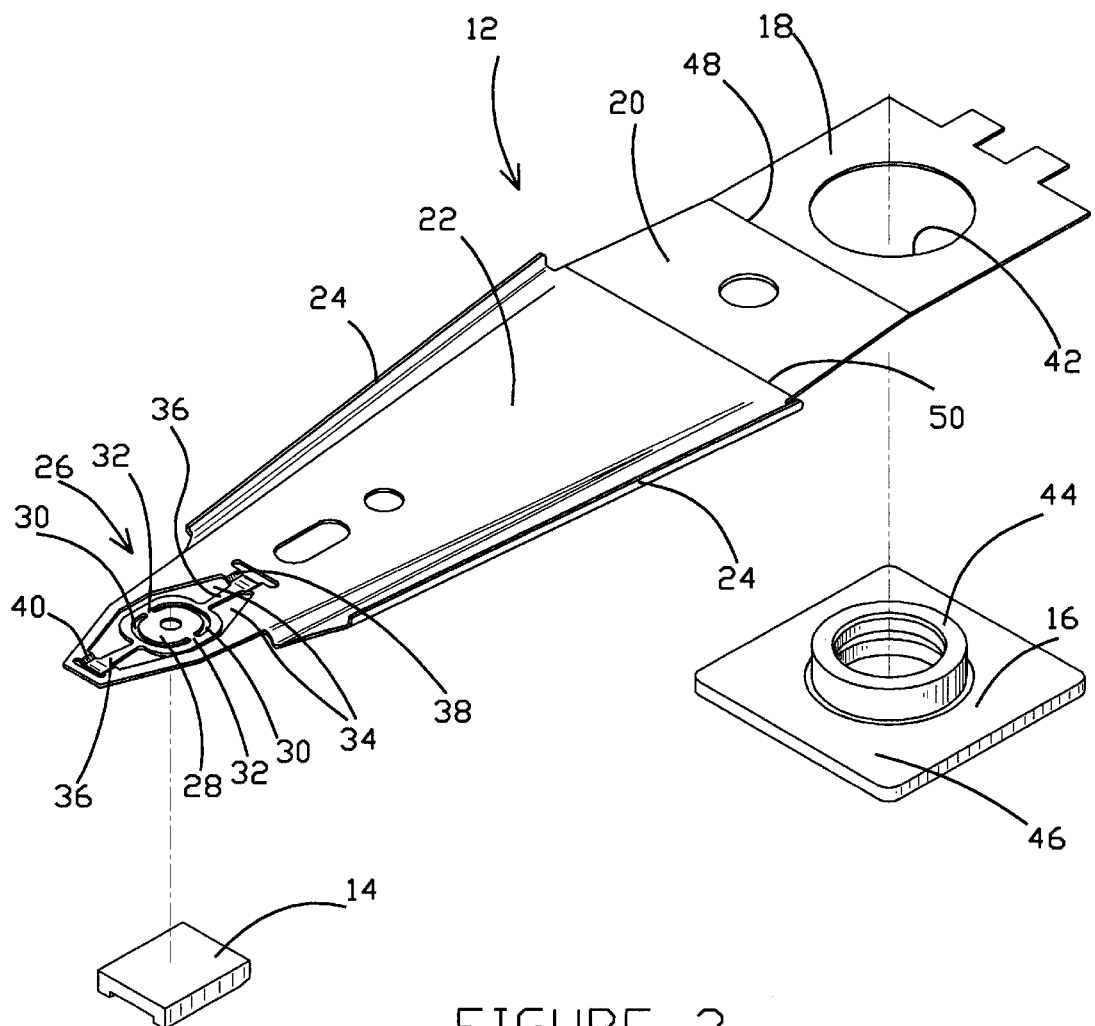
FIG. 2 is an exploded isometric view of the suspension assembly of FIG. 1 showing a load beam with an integrated gimbal, a base plate, and a head slider.

With reference now to the drawings, wherein like components are indicated with like numerals throughout the several figures, and initially to FIGS. 1 and 2, a suspension assembly 10 is illustrated which is particularly designed for use within a rigid disk drive assembly or similar dynamic storage device. As shown in FIG. 2, the suspension assembly 10 basically comprises a load beam 12, a slider 14, and a base plate 16.

The load beam 12 is itself comprised of functional portions including a rigid actuator mounting region 18, a spring region 20, and a rigid section 22. The rigid section 22 further comprises stiffening rails 24 which enhance stiffness properties of the rigid section 22 and which are known to be provided in a variety of ways including side rails, such as illustrated, and/or internal rails or channels. The stiffening rails 24 are primarily provided to increase the longitudinal stiffness of the rigid section 22 so as to provide a requisite load or force at the distal tip of the load beam 12 to the slider 14. As set out above in the Background section, this load is used to provide a counteracting force against a lift force generated by the aerodynamics between slider 14 and the air above a spinning disk surface. Stiffening rails 24, however, also affect resonance frequencies of the suspension assembly 10, specifically in that the cross section across the load beam 12 at any given point affects its resonance frequencies. Stiffening rails 24 are particularly used for increasing the resonance frequency of the lateral bending mode.

A spring connection is provided between slider 14 and the load beam 12 at its distal end by a gimbal region 26 which permits the slider 14 to move in its pitch and roll directions so that it can compensate for fluctuations of a spinning disk surface. Many different types of gimbals are known to provide the spring connection allowing for pitch and roll movement of the slider 14. Any gimbal is contemplated to be used with the present invention. Illustrated is one specific example including a slider mounting pad 28 to which the upper surface of slider 14 can be conventionally connected, such as by the use of adhesive or the like. Inner slots 30 of the gimbal region 26 allow the slider mounting pad 28 to pivot about a transverse axis defined by bridges 32. Likewise, to permit pivoting of the slider mounting pad 28 about a longitudinal axis, outer slots 34 define bridges 36 connected with the rigid structure at the distal tip of the load beam 12. Note that the bridges 36, as shown, are off-set from the general plane of the load beam 12 as shown at 38 and 40 to space the slider mounting pad 28 from the general plane of the load beam 12 so as not to interfere with pitch and roll movements.

The actuator mounting region 18 can comprise any number of configurations and provides the functional region of the load beam 12 for connecting the load beam 12 to any conventional or developed actuator assembly (not shown) of a disk drive assembly (not shown), whether the actuation is rotational or linear. According to the illustrated embodiment, the actuator mounting region 18 includes a circular opening 42 which is utilized for connecting the load beam 12 to the base plate 16 to enhance the rigid connection of the load beam 12 with an actuator assembly.

Base plate 16 can be conventionally connected with the actuator mounting region 18 such as by welding, and according to the illustrated embodiment, includes a circular collar 44 which fits within the circular opening 42 of the actuator mounting region 18 and a plate region 46 which is preferably connected to the material of the actuator mounting region 18 and to enhance the rigidity of the actuator mounting region 18.

Between the actuator mounting region 18 and the rigid section 22, the spring region 20 is provided. The primary purpose of the spring region 20 is to provide the load at the gimbal region 26 of the load beam 12 to the slider 14. To do this, the spring region 20 includes a first preformed bend 48. The first preformed bend 48, in order to provide the load, is bent in a first rotational direction for functionally biasing the slider 14 toward a disk surface when in use. The amount of bend of first preformed bend 48 is determined on the basis of the requisite load needed to counteract the aerodynamic lift force to be generated on slider 14 when flying over a moving disk surface and to establish the fly height of the slider 14. Generally, the greater the amount of bend of first preformed bend 48, the greater the load applied at the gimbal region 26. The first preformed bend 48 can be provided by any conventional bending process such as a rolling process over a mandrel or forming die. However, the requisite load should be provided to the slider 14 in a loaded state of the suspension assembly 10.

In order to assist in the control of the resonance characteristics of the suspension assembly 10, in accordance with the present invention, a second preformed bend 50 is also provided within the spring region 20. The second preformed bend 50 is provided as a bend in the opposite rotational direction as the first preformed bend 48. The purpose of the second preformed bend 50 is to provide an additional control of the part profile of the suspension assembly 10 when in a loaded state. In accordance with the present invention, it has been discovered that the provision of even a slight second preformed bend 50 can have a profound affect on the part profile of the suspension assembly 10 when loaded. The effect not only depends on the angle of the second preformed bend 50, but also the location thereof along the spring region 20 and its relative location to or spacing from the first preformed bend 48.

As set forth in the Background of the subject application, controlling the part profile is an important way to control gains associated with resonance frequencies, particularly with torsional resonance frequencies. One of the objects of controlling the part profile is to locate the axis of rotation of the suspension assembly 10 of one or more of the torsional resonant modes to pass through a point which minimizes slider 14 movement, such as in most cases, the gimballing point of the slider 14. In the illustrated case, the gimballing point is that defined by the intersection of the longitudinal gimballing axis of bridges 36 and the transverse gimballing axis of bridges 32. The provision of the second preformed bend 50 permits the realization to locate the axis of rotation of one or more torsional resonance frequencies through the gimballing point in situations that may have been otherwise unattainable given the constraints of the load force, other characteristics of the suspension assembly design, and process limitations. Moreover, even in those cases where it is possible to locate such axis of rotation of a torsional mode at the gimballing point with a single preformed bend 48, the provision of the second preformed bend 50 provides an additional manner of control that may open up possibilities for modification of the first preformed bend 48 either in degree of bend or location thereof within the spring region 20 depending upon the usage situation. Moreover, the second preformed bend 50 provides at least another manner of controlling the part profile of suspension assemblies.

Figure 3:
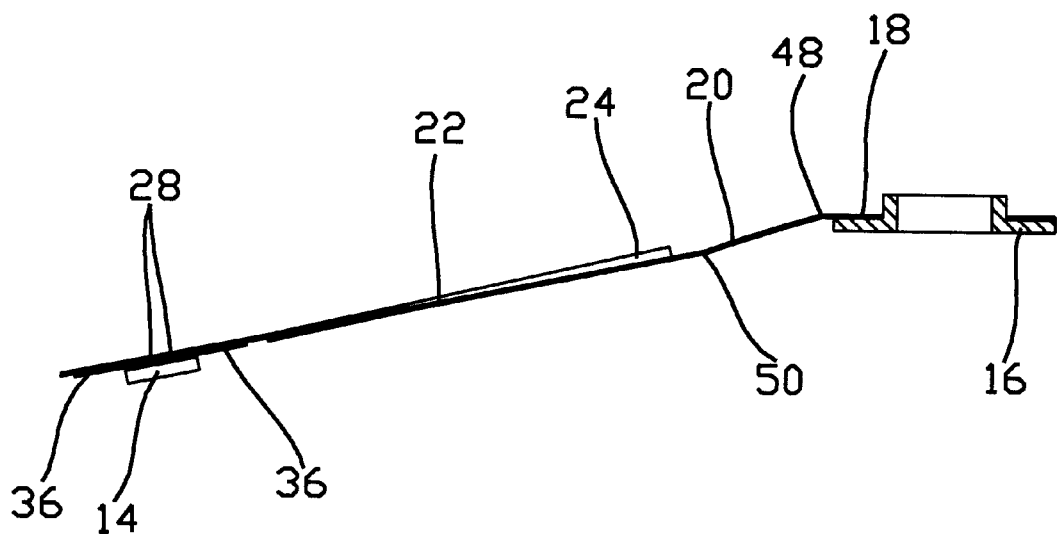
FIG. 3 is a longitudinal cross-sectional view of the suspension assembly of FIG. 1 in its free state (unloaded)
Figure 4:
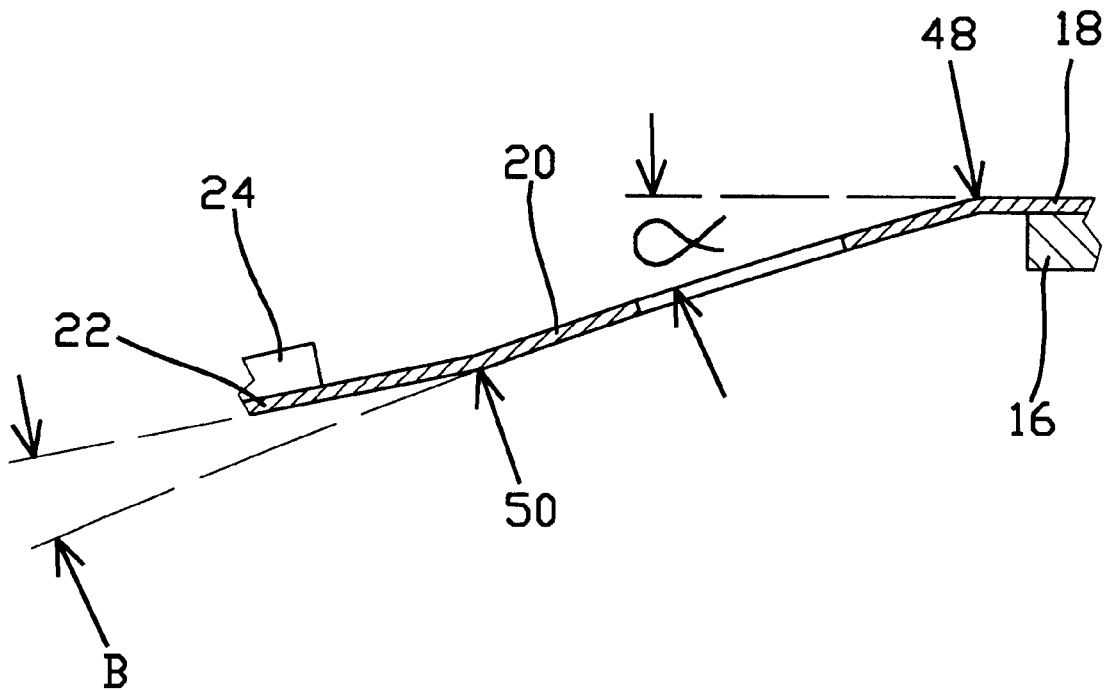
FIG. 4 is an enlarged view of the spring region of the suspension assembly shown in FIG. 3 also in the free state.

As shown in FIGS. 3 and 4, the first and second preformed bends 48 and 50, respectively, define the profile of the suspension assembly 10 in an unloaded state. First preformed bend 48 is preferably made by a rolling operation around a mandrel which gives the first preformed bend 48 a radius of curvature. The first preformed bend 48 primarily controls the load at the slider 14 and its angle of rotational bend $\alpha$ is largely dependent on the desired load. The second preformed bend 50 is provided in an opposite rotational direction as angle $\alpha$, the degree of bend represented by angle $\beta$, as shown.

Figure 5:
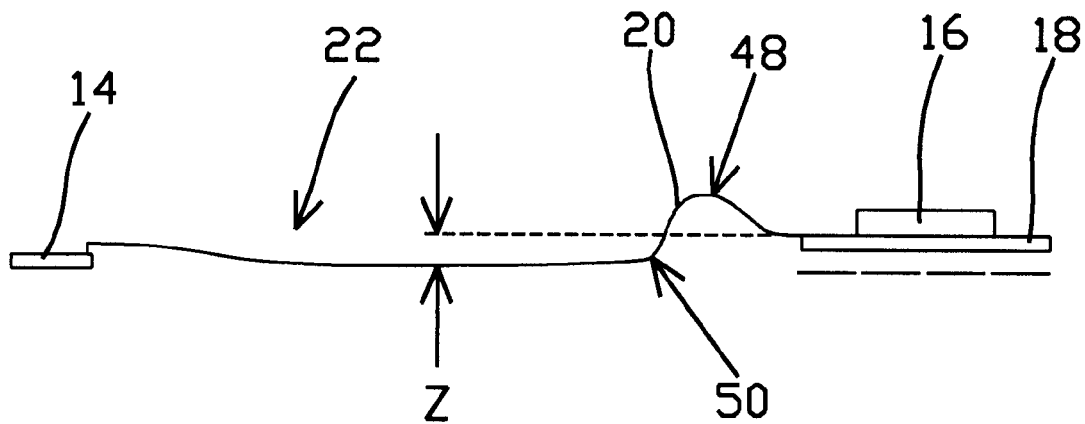
FIG. 5 is a part profile of the suspension assembly of FIG. 1 in a loaded state with the slider at fly height.
Figure 6:
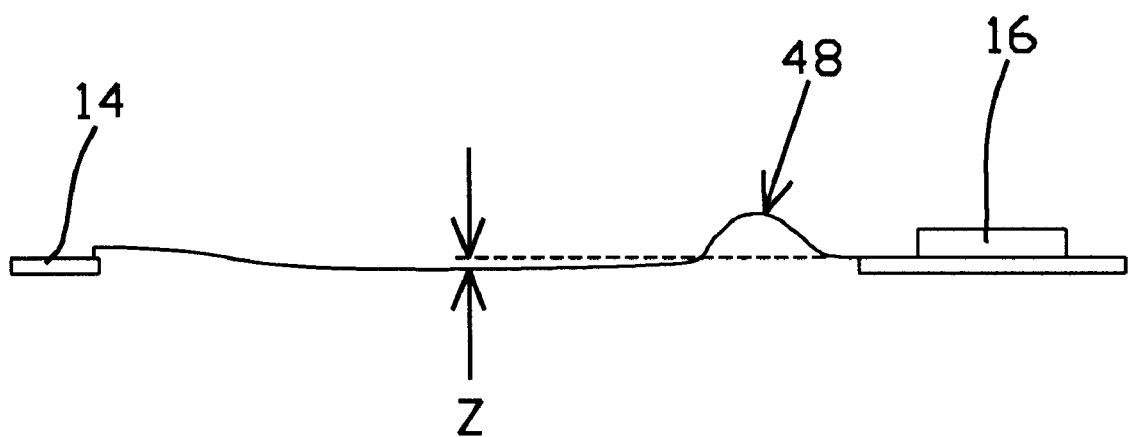
FIG. 6 is a part profile of a comparative suspension assembly made without a second preformed bend within its spring region in a loaded state with its slider at fly height.

With reference to FIGS. 5 and 6, the affect of the second preformed bend 50 will be discussed. FIG. 5 represents the part profile, as defined above in the Background section, of a suspension assembly 10 in a loaded state; that is with its slider 14 at fly height. Fly height is obtained as a balance of the load counteracting a lift force applied to slider 14. FIG. 6, on the other hand, is representative of a comparative part profile of a suspension assembly provided with a first bend 48 and which is similar to the first bend 48 of FIG. 5 but without the second preformed bend 50. In FIG. 6, slider 14 is also represented at fly height.

One way of comparing the part profiles is to compare an average level of the rigid section 22 with the level of the actuator mounting region 18. As shown in FIGS. 5 and 6, a dashed reference line is illustrated at the level of the actuator mounting region 18. The average level of the rigid section 22 can be determined based on a number of points thereon and is represented as a particular point, and the level of that point is compared to the level of the reference line. The difference in levels is noted as the Z-height.

In accordance with the present invention, the provision of the second preformed bend 50 with first preformed bend 48 allows larger Z-height values to be attained than those that were obtainable without the second preformed bend 50. Not only does the second preformed bend 50 physically shift a portion of the suspension assembly in an opposite direction than the load producing first bend 48, it also helps define the part profile of the loaded suspension assembly by controlling how it will bend under load. In defining the part profile, the location of the second preformed bend 50 comes into play as well as the spacing between the first and second preformed bends 48 and 50. As represented in FIG. 5, the location of and spacing between preformed bends 48 and 50 provide for a longer sloped area that allows a larger Z-height to be attained. The location of preformed bend 50 can otherwise be utilized to control the part profile of a suspension assembly to attain other Z-heights, higher or lower, depending on a process optimization, such as described below. The changing of the part profile, such as represented by Z-heights, affects the axis of rotation of torsional modes at resonance frequency. Thus, changing the part profile to achieve otherwise unattainable Z-heights, permits gain results to be attained that could not be attained with a single bend process. The second preformed bend 50 provides an additional control mechanism which is useable for minimizing resonance gains and optimizing performance. This is but one example of how the second preformed bend 50 can be used for a controlled shifting of the part profile. Second preformed bend 50 can be utilized for shifting the part profile to increase or decrease Z-heights depending on the specific situation.

Figure 7:
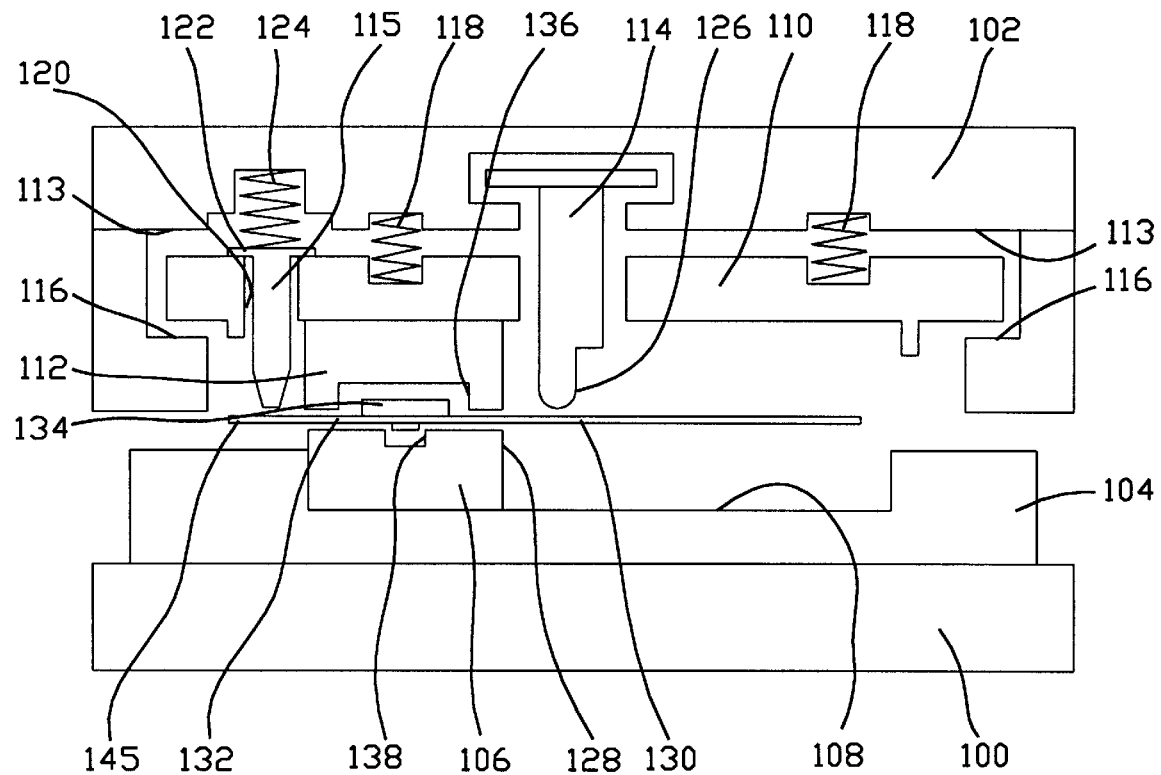
FIG. 7 is a schematic side view of a die assembly in its open position for forming a preformed bend in the spring region of a load beam of a suspension assembly.
Figure 8:
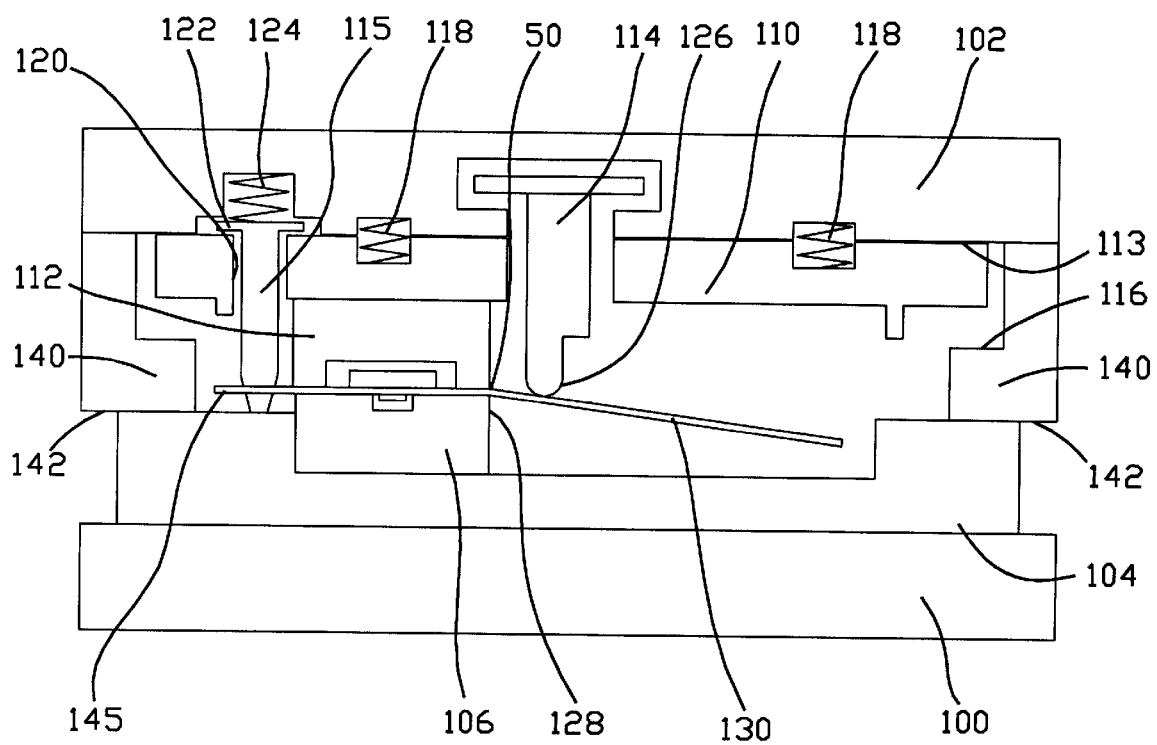
FIG. 8 is a schematic side view of the same die assembly shown in FIG. 7 but with the die in a closed position and with a preformed bend formed within the load beam.

It is contemplated that conventional rolling or forming operations can be utilized for providing the second preformed bend 50. A particular bending operation is illustrated in FIGS. 7 and 8 which schematically show a die apparatus in the open and closed positions thereof, respectively, and which is suitable for forming the second preformed bend 50. The die apparatus includes a lower plate 100 and an upper plate 102 which are relatively moveable with respect to one another by conventional means, such as under hydraulic, pneumatic, or mechanical control. Preferably, lower plate 100 is fixed in position and upper plate 102 is moveable toward and away from lower plate 100. Fixed to lower plate 100 is a support block 104 and a form block 106. Support block 104 is preferably fixed to the lower plate 100 while form block 106 is preferably adjustable within a slide 108 in a direction perpendicular to the direction of movement of the upper plate 102.

Upper plate 102 is preferably conventionally guided to move to and away from the lower plate 100 and includes a top pressure pad 110, a clamp block 112, a form punch 114, and a locating pin 115. The top pressure pad 110 is movably disposed to the upper plate 102 between upper stop surface 113 and a lower stop surface 116 provided on side bracket 140. Top pressure pad 110 is preferably also biased toward the lower stops 116 by means such as springs shown at 118. Clamp block 112 is fixed to the top pressure pad 110 in a corresponding position to the form block 106. Locating pin 115 is preferably provided through a bore 120 of the top pressure pad 110 and has a head portion 122 so that a biasing means such as spring 124 urges the head 122 of the locating pin 115 toward the upper surface of the top pressure pad 110. The form punch 114 is preferably adjustably fixed in position to the upper plate 102, the adjustment being in the direction of movement of the upper plate 102 toward and away from lower plate 100. A conventional adjustment mechanism, such as a set screw type assembly (not shown) can be used for fixing the form punch 114 in vertical position. Note that the engagement surface 126 of the form punch 114 is preferably rounded. Furthermore, the bending corner 128 of the form block 106 of the lower plate 100 is preferably sharp but deburred.

FIG. 7 illustrates the die apparatus in its open condition and with a load beam blank 130 with its actuator mounting region 132 and base plate 134 located between the clamp block 112 and the form block 106. Note that the clamp block 112 includes a relief at 136 and the form block 106 includes a relief at 138 to accommodate the base plate 134 attached to the load beam blank 130. The load beam blank 130 may be formed at this point while still being connected to a conventional carrier strip 145, and the pin 115 preferably fits within an opening (not shown) of the carrier strip 145 to align the load beam blank 130 in proper position.

FIG. 8 illustrates the die apparatus in a closed position, wherein the upper plate 102 has been moved toward the lower plate 100 to form the second preformed bend 50 within the load beam blank 130. Specifically, the engagement surface 126 of the form punch 114 bends the free portion of the load beam blank 130 about the bending corner 128 of the form block 106 in a rotational direction. The amount of bend is determined by the degree that the form punch 114 is moved toward the lower plate 100 after initial engagement. At least just prior to the engagement of the surface 126 of the form punch 114 with the upper surface of the load beam blank 130, the clamp block 112 with the form block 106 clamps the actuator mounting region end of the load beam blank 130 in position. The movement between the top pressure pad 110 and the upper plate 102 facilitates the further movement of the form punch 114 to cause the preformed bend 50 after clamping has occurred. The lower surfaces 142 of the side brackets 140 set the limit of advancement of the upper plate 102 towards the lower plate 100. Once the preformed bend 50 is formed, the upper plate 102 is moved to its opened position and the load beam blank 130 can be removed.

Preferably, the second preformed bend 50 is formed as above before the formation of the first preformed bend 48. Then, the first preformed bend 48 can be formed in a manner which ensures that the specific load needed at the slider can be obtained without having to compensate for the formation of the second preformed bend 50 thereafter.

Figure 9:
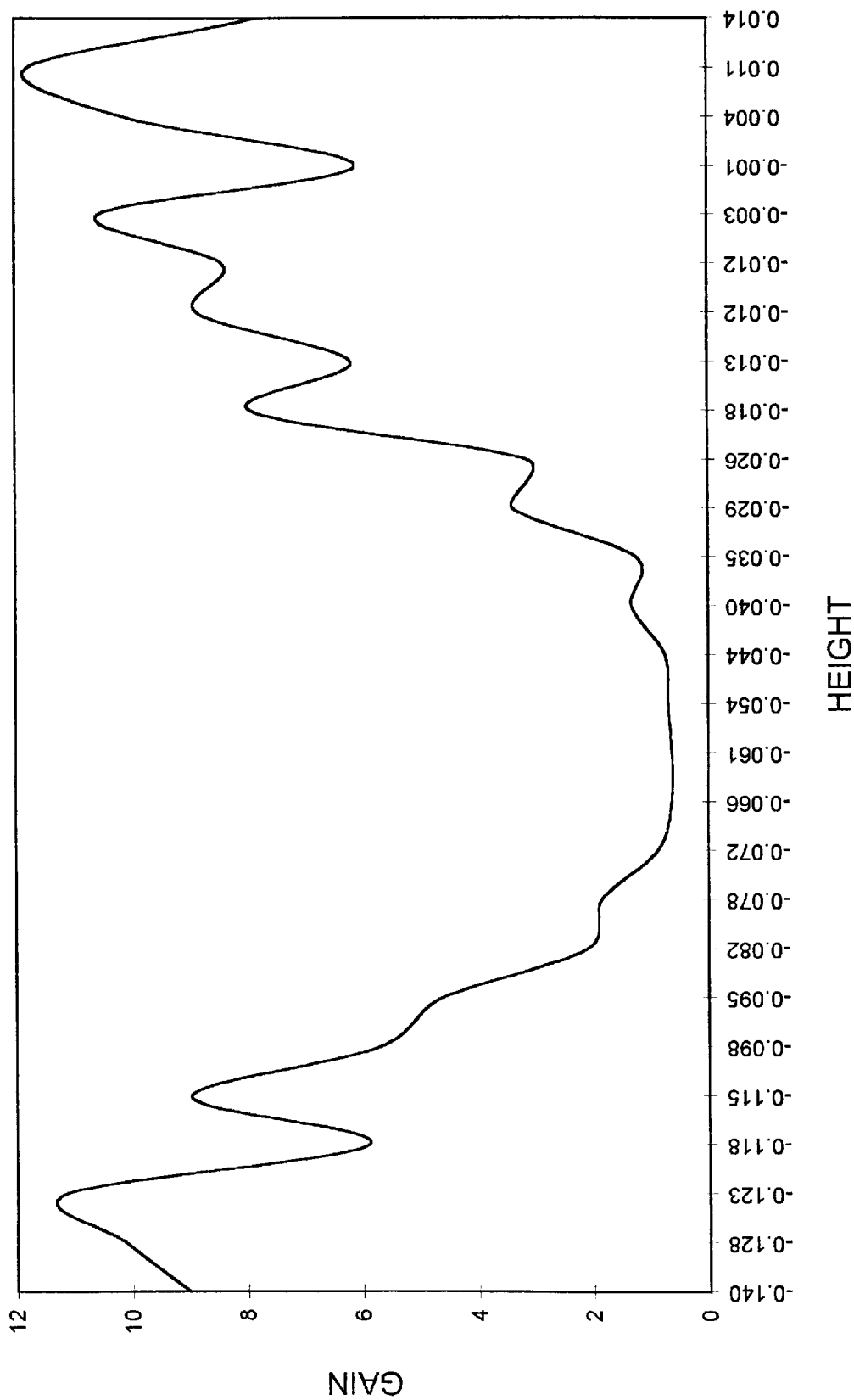
FIG. 9 is a graphical illustration comparing gain versus height (Z-height) for first torsional gain as the part profile is modified for minimizing gain and optimizing a suspension assembly.

In order to show how the provision of a second preformed bend 50 affects the performance characteristics, specifically in optimizing a suspension assembly to minimize first torsional gain, a specific example of an optimization process for a particular suspension assembly will be described. FIG. 9 represents the comparison of first torsional gain (y-axis) versus part profile as represented by Z-height (x-axis) determined as shown in FIGS. 5 and 6. At the point where the curve most nearly touches or reaches the x-axis, gain is minimized. That is, the axis of rotation of the first torsional mode at resonance passes near or through the gimballing point.

According to this example, a series of similar suspension assemblies manufactured by Hutchinson Technology Incorporated of Hutchinson, Minn., and used within the commercial "Scorpion™" drive from IBM Company, were provided with a variety of Z-heights when loaded. Each was vibrated at its first torsional resonance frequency, and the gain was measured. In each case, the radius of the first preformed bend 48 was constant, and was provided by a rolling operation about a 0.51 mm (0.02 inch) radius mandrel. Some included only a first preformed bend 48 with the difference between them being the radius location of the first preformed bend 48 along the spring region 20. Others had both preformed bends 48 and 50 in accordance with the present invention, and were varied from one another again by the location of the radius of the first preformed bend 48. The locating and angle of the second preformed bend 50 was constant.

According to this example, Z-heights of a maximum of about −0.025 mm could be attained without the second preformed bend 50. With the addition of the second preformed bend 50, the greater Z-heights shown in FIG. 9 (to the left of −0.025) were attained. As can be seen, optimal performance occurs at about the middle of the trough between about −0.072 and −0.044 mm. Thus, results not possible under the given constraints with a single bend are possible with the addition of the second preformed bend.

What is claimed is:

1. A load beam for a suspension assembly to be connected to an actuator and for supporting a head slider in a loaded state adjacent a disk surface within a rigid disk drive, said load beam comprising:

an actuator mounting region for connection to an actuator;

a rigid region between said actuator mounting region and a gimbal provided near an end of said load beam distal from said actuator mounting region, said gimbal for supporting a head slider and to permit flexure of a head slider in pitch and roll directions;

a spring region between said actuator mounting region and said rigid region for providing a load at said gimbal for urging a head slider toward a disk surface in a loaded state of the spring region, said spring region having in an unloaded free state a first preformed bend transverse to a longitudinal dimension of said load beam in a first rotational direction and a second preformed bend transverse to the longitudinal dimension of said load beam but in an opposite rotational direction than the direction of bend of the first preformed bend, wherein said spring region including said first and second preformed bends causes said load at said gimbal, and said rigid region between said spring region and said gimbal transfers said load to said gimbal.

2. The load beam of claim 1, wherein the degree of bend of said first preformed bend, as measured from a general plane of said actuator mounting region, is greater than the degree of bend of said second preformed bend, as measured from a general plane of the spring region between the first and second preformed bends.

3. The load beam of claim 2, wherein said first preformed bend is closer to said actuator mounting region than said second preformed bend.

4. The load beam of claim 3, in combination with a head slider mounted to one side of and near the distal end of said load beam by way of a gimbal which permits flexure of said slider in its pitch and roll directions.

5. The load beam and slider combination of claim 4, wherein surfaces of said load beam on said one side of said load beam that are joined together by said first preformed bend are angled with respect to one another by a first included angle of less than 180 degrees and surfaces of said load beam on a second side of said load beam that are joined together by said second preformed bend are angled with respect to one another by a second included angle of less than 180 degrees.

6. A suspension assembly to be connected to an actuator of a rigid disk drive and for supporting a head slider in a loaded state adjacent a disk surface within a rigid disk drive, said suspension assembly comprising:

an actuator mounting region for connection to an actuator;

a rigid region between said actuator mounting region and a gimbal provided near an end of said load beam distal from said actuator mounting region;

a spring region between said actuator mounting region and said rigid region for providing a load at said gimbal for urging a head slider toward a disk surface in a loaded state of the spring region, said spring region having in an unloaded free state a first preformed bend transverse to a longitudinal dimension of said load beam in a first rotational direction and a second preformed bend transverse to the longitudinal dimension of said load beam but in a opposite rotational direction than the direction of bend of the first preformed bend; and a slider mounted to one side of and near the distal end of said load beam by way of the gimbal which permits flexure of said slider in its pitch and roll directions, wherein surfaces of said load beam on said one side of said load beam that are joined together by said first preformed bend are angled with respect to one another by a first included angle of less than 180 degrees and surfaces of said load beam on a second side of said load beam that are joined together by said second preformed bend are angled with respect to one another by a second included angle of less than 180 degrees, and wherein said spring region including said first and second preformed bends causes said load at said gimbal, and said rigid region between said spring region and said gimbal transfers said load to said gimbal.

7. The load beam of claim 6, wherein the degree of bend of said first preformed bend, as measured from a general plane of said actuator mounting region, is greater than the degree of bend of said second preformed bend, as measured from a general plane of the spring region between the first and second preformed bends.

8. The load beam of claim 7, wherein said first preformed bend is closer to said actuator mounting region than said second preformed bend.

9. A method of making a load beam for a head suspension assembly to be connected to an actuator and for supporting a head slider in a loaded state adjacent a disk surface within a rigid disk drive, said method comprising:

providing a load beam including an actuator mounting region for connection to an actuator, a rigid region between the actuator mounting region and a gimbal provided near an end of the load beam distal from the actuator mounting region, and a spring region between the actuator mounting region and the rigid region for urging a head slider toward a disk surface in a loaded state of the spring region;

permanently forming a first bend within the spring region of the load beam transverse to a longitudinal dimension of the load beam in a first rotational direction; and permanently forming a second bend within the spring region also transverse to the longitudinal dimension of the load beam but in an opposite rotational direction than the direction of bend of the first bend, whereby, in an unloaded free state existing when no counteracting force is being applied at said gimbal, the spring region includes the first and second bends.

10. The method of claim 9, wherein said steps of forming the first and second bends further comprise forming the degree of bend of the first bend, as measured from a general plane of said actuator mounting region, to be greater than the degree of bend of the second bend, as measured from a general plane of the spring region between the first and second bends.

11. The method of claim 10, wherein the first bend is formed closer to the actuator mounting region than the second bend.

12. The method of claim 11, wherein said step of forming said second bend is performed before said step of forming said first bend.

13. The method of claim 12, wherein said step of forming said second bend comprises bending the load beam blank about the edge of a form block of a forming die.

14. The method of claim 13, wherein said step of forming said second bend further comprises applying a forming punch against a first surface of the load beam blank and advancing the forming punch for bending the load beam blank about the edge of the form block.

* * * * *